(12) United States Patent
Ogata et al.

(10) Patent No.: US 6,344,278 B1
(45) Date of Patent: Feb. 5, 2002

(54) COATING METHOD OF AMORPHOUS TYPE TITANIUM PEROXIDE

(75) Inventors: Shiro Ogata, Tokyo; Yoshimitsu Matsui, Saga-ken, both of (JP)

(73) Assignees: Tao Inc., Tokyo; Tio Techno Co. Ltd., Saga, both of (JP)

( * ) Notice: Subject to any disclaimer, the term of this patent is extended or adjusted under 35 U.S.C. 154(b) by 0 days.

(21) Appl. No.: 09/663,711

(22) Filed: Sep. 18, 2000

Related U.S. Application Data

(62) Division of application No. 09/051,237, filed as application No. PCT/JP97/02677 on Aug. 1, 1997, now Pat. No. 6,235,401.

(30) Foreign Application Priority Data

Aug. 6, 1996 (JP) ............................................. 8-207049

(51) Int. Cl.[7] .................................................. B32B 9/00
(52) U.S. Cl. ....................... 428/472; 428/469; 428/701; 427/190; 427/201; 427/331; 427/372.1; 427/376.2; 427/419.2; 427/453
(58) Field of Search ................................ 428/472, 465, 428/701; 427/190, 201, 331, 372.2, 371.2, 419.2, 453

(56) References Cited

U.S. PATENT DOCUMENTS 6,107,241 A * 8/2000 Ogata et al. ................. 502/350

FOREIGN PATENT DOCUMENTS

| | | |
|---|---|---|
| EP | 0 684 075 A1 | 11/1995 |
| GB | 1412937 | * 11/1975 |
| JP | 49-108000 | 10/1974 |
| JP | 62-252319 | * 11/1987 |
| JP | 2-31008 | 7/1990 |
| JP | 7-155598 | 6/1995 |
| JP | 7-171408 | 7/1995 |
| JP | 7-232080 | 9/1995 |
| JP | 7-286114 | 10/1995 |
| JP | 9-262481 | 10/1997 |
| WO | WO97/36677 | 10/1997 |

OTHER PUBLICATIONS

Ichinose et al., "Synthesis of Peroxo–Modified Anatase Sol from Peroxo Titanic Acid Solution", Journal of the Ceramic Society of Japan, International Edition, vol. 104, No. 8 (Aug. 1996) pp. 697–700.

Ichinose et al., "Properties of Anatase Films for Photocatalyst from Peroxotitanic Acid Solution and Peroxo–Modified Anatase Sol", Journal of the Ceramic Society of Japan, International Edition, vol. 104, No. 10 (Oct. 1996), pp. 909–912.

* cited by examiner

*Primary Examiner*—Archene Turner
(74) *Attorney, Agent, or Firm*—Armstrong, Westerman, Hattori, McLeland & Naughton, LLP

(57) ABSTRACT

A hydrophilic treatment by the use of a surface active agent and the like is not required for a base even the surface of which is water-repellent or thermoplastic when a viscous amorphous type titanium peroxide is used for fixing a base as a binder. In addition, a thin layer of a photocatalyst semiconductor, a dielectrical ceramics or an electrical ceramics can be easily formed by adhering particles of a photocatalyst semiconductor, a dielectrical ceramics or an electrical ceramics to the layer of a viscous amorphous type titanium peroxide, which is a layer as a binder, in a homogeneously floating state gas. Furthermore, a layer of a titanium oxide having a photocatalyst function can be formed when a base is fixed with a viscous amorphous type titanium peroxide.

2 Claims, 1 Drawing Sheet

COATING METHOD OF AMORPHOUS TYPE TITANIUM PEROXIDE

This application is a division of prior application Ser. No. 09/051,237 filed Apr. 19, 1999, now U.S. Pat. No. 6,235,401, which is national stage application under §371 of international application PCT/JP97/02677 filed Aug. 1, 1997.

BACKGROUND OF THE INVENTION

1. Field of the Invention

The present invention relates to a method for coating a substrate with an amorphous type titanium peroxide. More specifically, it relates to a method for coating a substrate having a water repellent surface with viscous amorphous type titanium peroxide having excellent adhesive properties, and it also relates to a board having a thin layer of a photocatalytic semiconductor or a dielectric-conductive ceramic material in which the titanium peroxide is used as a binder.

2. Description of the Related Art

Heretofore, as methods for coating a substrate with a photocatalytic semiconductor and a dielectric-conductive ceramic material, there are techniques such as a sputtering method, a vapor deposition method and a high temperature sintering method using a transcription printing film.

As fixing methods of the photocatalytic semiconductor, there are known a method which comprises adding various kinds of organic binders and silica gels and then carrying out heat work (Japanese Patent Application Laid-open No. 171408/1995), a method which comprises using a glaze, an inorganic glass, a thermoplastic resin, a solder or the like as a binder (Japanese Patent Application Laid-open No. 232080/1995), and a method which comprises fixing the photocatalytic semiconductor on a board by the utilization of $SnO_2$ as a coagulation agent (Japanese Patent Application Laid-open No. 155598/1995).

However, the sputtering method and the vapor deposition method require a high cost for a coating apparatus, and in the transcription printing method, a thermal stress which loads on the board or the like must be considered and the selection of a material is restricted.

Furthermore, in a method for fixing the photocatalytic semiconductor and the dielectric-conductive ceramic material by the use of the binder, the surface of the substrate is required to be pre-treated with a surface active agent and a caustic soda solution, when the surface of the substrate is water repellent. Furthermore, it is difficult to sufficiently carry out an oxidation-reduction function and a dielectric-conductive function, because particles of the photocatalytic semiconductor and the dielectric-conductive ceramic material are buried in the binder.

Additionally, as titanium peroxide, in Japanese Patent Application Laid-open No. 286114/1995, there is mentioned a coating solution for film formation comprising peroxopolytitanic acid which is a polymer of peroxotitanic acid. It has also been disclosed therein that this peroxopolytitanic acid can be obtained by adding hydrogen peroxide to a gel or a sol of titanium oxide hydrate or a mixed dispersion thereof, and then treating it at room temperature or heating it at 90° C. or less (heating at 80° C. for 1 hour in Example 1).

In addition, there is also known a viscous or a jelly state product which can be obtained by condensing an aqueous titanium peroxyhydrate solution (Japanese Patent Application Laid-open No. 252319/1987). It is described therein that this product can be obtained as a yellow film by adding aqueous hydrogen peroxide to a fine powder of titanium hydride to prepare a yellow aqueous titanium peroxide solution, and then allowing it to stand at ordinary temperature, thereby slowly advancing the evaporation of water and the condensation of a solute.

However, peroxopolytitanic acid described in Japanese Patent Application Laid-open No. 286114/1995 mentioned above can be obtained by adding hydrogen peroxide to a gel or a sol of titanium oxide hydrate or a mixed dispersion thereof, and then treating at ordinary temperature or heating it at 90° C. or less, and therefore, this peroxopolytitanic acid is different in a preparation process from "the viscous amorphous type titanium peroxide" of the present invention which can be obtained by adding hydrogen peroxide to titanium oxide hydrate, and then carrying out the reaction at 15° C. or less. In addition, they are largely different from each other in physical properties, particularly viscosity, and the conventional product is poor in the function as a binder, so that it is difficult to form a thin layer of the photocatalytic semiconductor and the dielectric-conductive ceramic material.

Furthermore, a viscous or a jelly state product which is obtained by condensing an aqueous titanium peroxyhydrate solution described in the above-mentioned Japanese Patent Application Laid-open No. 252319/1987 can be obtained as a yellow film by adding aqueous hydrogen peroxide to a fine powder of titanium hydride to prepare a yellow aqueous titanium peroxide solution, and then evaporating water from this yellow aqueous titanium peroxide solution. Therefore, this conventional product is different in a preparation process from "the viscous amorphous type titanium peroxide" of the present invention which can be obtained by adding hydrogen peroxide to titanium oxide hydrate, and then carrying out the reaction at 15° C. or less. In addition, they are different from each other in physical properties. As described in the above-mentioned Japanese Patent Application Laid-open 286114/1995 (the second column), the conventional product has a problem that it is stable only in an extremely low concentration and it cannot be present in a stable state for a long time. Moreover, a thin layer formed from the conventional product on a substrate is easily cracked or peeled off, and the thin layer becomes porous after a high-temperature calcination.

SUMMARY OF THE INVENTION

An object of the present invention is to provide a coating material unlimited by thermoplasticity of a substrate which does not need a hydrophilic treatment by the use of a surface active agent and the like, even when the surface of the substrate is water repellent or the substrate is thermoplastic.

Another object of the present invention is to provide a method for forming a film, in which a thin layer of a photocatalytic semiconductor or a dielectric-electrical ceramic material may be easily formed and thickness of the thin layer may be controlled easily and the photocatalytic semiconductor or the like is not buried by a binder.

The present inventors have intensively investigated trying to achieve the above-mentioned objects, and as a result, the present invention has now been completed by fixing the use of a viscous amorphous type titanium peroxide or the like as a binder layer on a substrate, or by attaching fine particles of a photocatalytic semiconductor, a dielectric ceramic material or a conductive ceramic material on a viscous amorphous type titanium peroxide layer in a uniform scattering state of the fine particles in a gas, or by fixing a viscous amorphous type titanium peroxide on a substrate and then heating and calcining it to form a titanium oxide layer having a photocatalytic activity.

That is to say, the present invention is directed to a method for fixing an amorphous type titanium peroxide layer on a substrate which comprises the steps of coating the substrate with an amorphous type titanium peroxide sol, or coating the substrate with a viscous amorphous type titanium peroxide without hydrophilization treatment of a surface of the substrate with a surface active agent or the like, and drying and calcining it at room temperature to less than 250° C.; and a board having the amorphous type titanium peroxide layer obtained by this method.

Moreover, the present invention is directed to a method for fixing a titanium oxide layer on a substrate which comprises the steps of coating the substrate with an amorphous type titanium peroxide sol, or coating the substrate with a viscous amorphous type titanium peroxide without hydrophilization treatment of a surface of the substrate with a surface active agent or the like, and drying and calcining it at 250° C. or more; and a board having the titanium oxide layer obtained by this method.

Additionally, the present invention is directed to a method for fixing a thin layer of a photocatalytic semiconductor, a dielectric ceramic material or a conductive ceramic material on a substrate which comprises the steps of coating the substrate with an amorphous type titanium peroxide sol, or coating the substrate with a viscous amorphous type titanium peroxide without hydrophilization treatment of a surface of the substrate with a surface active agent or the like, thereby forming an amorphous type titanium peroxide layer, and then attaching fine particles of the photocatalytic semiconductor, the dielectric ceramic material or the conductive ceramic material in a uniformly scattered state in a gas onto the amorphous type titanium peroxide layer, while the amorphous type titanium peroxide layer is still sticky; and a board which comprises a substrate, the amorphous type titanium peroxide layer formed on the substrate, and a thin layer of the photocatalytic semiconductor, the dielectric ceramic material or the conductive ceramic material formed on the amorphous type titanium peroxide layer and which can be obtained by the above-mentioned method.

Furthermore, the present invention is directed to a method for preparing a viscous amorphous type titanium peroxide which comprises the steps of reacting a titanium tetrachloride solution with an ammonium hydroxide solution in an acidic range of pH 2 to 6, washing a sedimented lightly bluish white orthotitanic acid, diluting or concentrating the solution to adjust a solid concentration to 0.2 to 0.6% by weight, adding aqueous hydrogen peroxide to the aqueous solution, carrying out a reaction with stirring at a low temperature, preferably at 15° C. or less, particularly preferably at about 5 to 8° C., and then curing it at ordinary temperature; and the viscous amorphous type titanium peroxide prepared by this method.

DETAILED DESCRIPTION OF THE INVENTION

Figure 1:
FIG. 1 is an illustrative view showing a method for fixing a substrate with a thin layer of a photocatalyst semiconductor, a dielectric ceramic material or a conductive ceramic material.
Figure 1:
Figure 1:
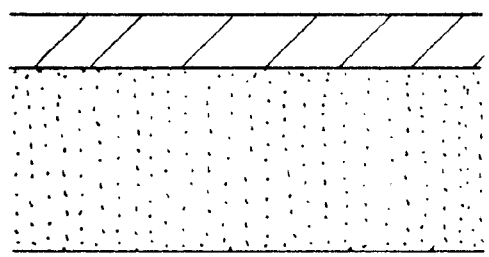
Figure 1:
Figure 1:
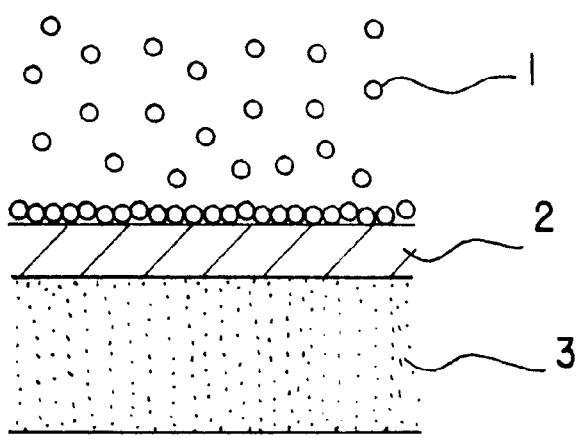

"The amorphous type titanium peroxide sol" in the present invention may be prepared, for example, as follows.

Aqueous ammonium or an alkali hydroxide such as a sodium hydroxide is added to an aqueous titanate solution such as titanium tetrachloride $TiCl_4$ and a reaction is carried out, maintaining a pH of a reaction solution at 6 to 7. After washing and separation of the resultant lightly bluish white non-crystalline formless titanium hydroxide $Ti(OH)_4$ (which is also called orthotitanic acid $H_4TiO_4$), it is treated with aqueous hydrogen peroxide to obtain a titanic peroxide sol in an amorphous state.

"The amorphous type titanium peroxide" which is thus obtained in the present invention has a pH of 6 to 7 and a particle diameter of 8 to 20 nm, and its appearance is a yellow transparent solution and it is stable if preserved at ordinary temperature for a long time. In addition, a sol concentration is usually adjusted to 1.4 to 6% by weight, but this concentration can be adjusted as the need arises. In the case that is used at a low concentration, it can be diluted by distilled water or the like.

In addition, this amorphous type titanium peroxide sol is in an amorphous state at ordinary temperature and it is not crystallized yet into an anatase type titanium oxide, so that it has excellent adhesive properties and high film formation properties. Moreover, a uniform flat thin film can be formed therefrom, and its dry film is not dissolved in water.

On the other hand, when an amorphous type titanium peroxide sol is heated at 100° C. or more for several hours, the anatase type titanium oxide sol is obtained, and in addition, when a substrate coated with an amorphous type titanium peroxide sol and then dried and fixed is heated at 250 to 940° C., an anatase type titanium oxide is obtained.

"The viscous amorphous type titanium peroxide" mentioned in the present invention can be prepared, for example, as follows. An ammonium solution or an alkali hydroxide such as a sodium hydroxide is added to a titanic salt solution such as a titanium tetrachloride $TiCl_4$ and a reaction is carried out, maintaining a pH of a reaction solution in the acidic range, preferably at 2 to 6, particularly at 2. After the washing and separation of the precipitated lightly bluish white non-crystalline titanium hydroxide $Ti(OH)_4$ (which is also called orthotitanic acid $H_4TiO_4$), it is treated by a hydrogen peroxide solution and a reaction is carried out with stirring at a low temperature, preferably at 15° C. or less, particularly preferable at 5 to 8° C. and then cured at ordinary temperature for 7 to 10 days.

"The amorphous type titanium peroxide" which is thus obtained in the present invention has a pH of 2 to 4, a particle diameter in the range of about 8 to 20 nm. Appearance of this compound is a yellow transparent and slightly viscous sol to semi-jelly state, i.e., it has various viscosities and very strong adhesive force, and it is stable if preserved at ordinary temperature for a long time. In addition, its solid concentration is usually 0.2 to 0.6% by weight, preferably 0.3% by weight, but the concentration can be adjusted as the need arises.

"The viscous amorphous type titanium peroxide" in the present invention having various viscosities can be obtained by varying a pH in the acidic range preferably 2 to 6 in a reaction of a titanate solution such as titanium tetrachloride $TiCl_4$ with an alkali hydroxide such as aqueous ammonium or sodium hydroxide, or by varying a solid concentration in the range of 0.2 to 0.6% by weight in the preparation process. It may be used for various purposes according to the viscosity, but for the purpose of forming a thin film having a uniform thickness, it is desirable that the product has a such viscosity that the product is in a uniform and semi-jelly state.

Moreover, when the pH of the reaction mentioned above exceeds 6, a problem arises because it turns to an amorphous type titanium peroxide sol having a low viscosity and a hydrophilization treatment by the use of a surface active agent or the like is required in coating a surface of a highly water-repellent substrate such as a metal, plastic and the like, and when the pH of the reaction is below 2, the amount of the deposition of the orthotitanic acid is extremely small.

Furthermore, when the solid concentration exceeds 0.6% by weight, a problem arises that the compound turns to be in a heterogeneous semi-jelly state and it is difficult to form a thin layer with an equal thickness, and on the other hand, when the solid concentration is below 0.2% by weight, a problem arises that a hydrophilization treatment by the use of a surface active agent and the like is required in coating the surface of a substrate.

The viscous amorphous type titanium peroxide in the present invention is thus obtained as a new yellow transparent and viscous substance, is in an amorphous state at room temperature, and is not yet crystallized to anatase type titanium oxide, so that the stickiness and adhesive properties of which are extremely excellent to water repellent substrates as well as substrates any materials. In addition, it is highly capable of forming a film and forms a homogeneous and flat thin layer easily. Its dry film does not dissolve in water.

Additionally, when this viscous amorphous type titanium peroxide is coated on a substrate and is dried at ordinary temperature and calcined at 250° C. or less, it forms a layer of amorphous type titanium peroxide having a high adhesive ability. Furthermore, it forms a layer of anatase type titanium oxide when it is heated, dried and burnt at 250 to 940° C., and on the other hand, it forms a layer of rutile type titanium oxide and substantially loses a photocatalyst activity when it is heated at 940° C. or more.

In the present invention, an inorganic material such as a ceramic material and a glass, an organic material such as a plastic, a rubber and a timber, and metallic materials such as aluminum and steel can be used as "the substrate". Among these materials, organic polymer resin materials such as an acrylonitrile resin, a vinyl chloride resin, a polycarbonate resin, a methyl methacrylate (an acrylic resin), a polyester resin, a polyurethane resin and the like show an excellent effect.

The size and shape of the substrate are not crystal. Therefore the substrate may be a film, a honeycomb, a fiber, a filtration sheet, a bead, or a foam, or a combination of these. In addition, when the substrate is permeable to ultraviolet rays, an inside of it may be employed and a panted article can also be employed.

For example, well-known methods such as a dipping, a spraying and the like can be used for coating the substrate by the amorphous type titanium peroxide sol and the viscous amorphous type titanium peroxide.

After the substrate is coated by coating or spraying as described above, it is dried, burnt and solidified at below 250° C. to prepare the substrate having a layer of the amorphous type titanium peroxide mentioned in the present invention.

Moreover, it is also possible to prepare a substrate on which a layer of anatase type titanium oxide is solidified and supported, by sintering at about 250 to 400° C. after it is coated. The so-obtained substrate has a photocatalytic ability so that it is preferred that a source of a sodium such as a sodium hydroxide is made to be present, by cleaning a surface of a resin with a substance having sodium ions such as a sodium hydroxide prior to the use, by the use of a fact that the photocatalytic ability of the titanium oxide is reduced by sodium ions, when the substrate is made of an organic polymer resin which is susceptible to decomposition by a photocatalyst, such as polytetrafluoroethylene (PTFE) which is a highly efficient engineering plastic, polyamide-imide (PAI) or a polyimide (PI) which is a super heatproof engineering plastic.

A coating composition composed of the amorphous type titanium peroxide sol or the viscous amorphous type titanium peroxide is capable of forming a layer of a desired thickness by a single coating. In addition, the thickness of the thin layer of titanium peroxide formed by this coating or of a layer of titanium oxide which is obtained by heating and burning at 250° C. or more can be adjusted by controlling the solid concentration (% by weight) of titanium peroxide in the viscous amorphous type titanium peroxide and the like and by controlling the viscosity and thickness of the coating before the drying step. Incidentally, the coating step may be repeated where necessary.

The substrate having a layer of the amorphous type titanium peroxide described above is excellently weatherproof and protects a substrate composed of such as an organic polymer material from ultra violet rays and the like, in addition, it can protect a substrate composed of an organic polymer materials susceptible to decomposition by a photocatalytic action when a layer of a photocatalyst semiconductor is laid thereon.

Examples of "the photocatalyst semiconductor" in the present invention include $TiO_2$, $ZnO$, $SrTiO_3$, $CdS$ $CdO$, $CaP$, $InP$, $In_2O_3$, $CaAs$, $BaTiO_3$, $K_2NbO_3$, $Fe_2O_3$, $Ta_2O_5$, $WO_3$, $SaO_2$, $Bi_2O_3$, $NiO$, $Cu_2O$, $SiC$, $SiO_2$, $MoS_2$, $MoS_3$, $InPb$, $RuO_2$ and $CeO_2$. Among these examples, a titanium oxide $TiO_2$ is preferable, and a photocatalyst semiconductor should be used in the state of fine particles or a fine powder having a diameter of 0.001 to 20 $\mu$m.

Furthermore, as a supplement agent, Pt, Ag, Rh, $RuO_2$, Nb, Cu, Sn, NiO can be used for supporting a photocatalytic function.

"The dielectric ceramic" materials in the present invention include $SiO_2$, $Ta_2O_5$, $TiO_2$, $SrTiO_3$, $BaTiO_3$ and perovskite compounds in Pb system.

In addition, "the conductive ceramic" materials include alloys composed of substrate metals such as copper, nickel, chromium, titanium and aluminum.

These ceramic materials should be used in the state of fine particles or a fine powder having a diameter of 0.001 to 20 $\mu$m. These fine particles or powders can be dispersed uniformly in air. "The method for fixing a substrate with a layer of a photocatalyst semiconductor, a dielectric ceramic material or a conductive ceramic material" in the present invention will be described with reference to FIG. 1. In one embodiment of such a method, substrate 3 which has been made hydrophilic by a surface active agent or the like is coated with the amorphous type titanium peroxide sol or a substrate 3 is directly coated with the viscous amorphous type titanium peroxide without a hydrophilic treatment so that it forms a layer of the amorphous type titanium peroxide; while the layer of the amorphous type titanium peroxide 2 is still adhesive (usually within 1 to 10 minutes at room temperature after coating), the above-mentioned fine particles of the photocatalyst semiconductor, the dielectric ceramic material or the conductive ceramic material 1 scattered uniformly in a gas by the use of a sealed pressure-keeping container are adhered to the layer of the amorphous type titanium peroxide by the use of natural adhesion or air-stream-pressure adhesion; and the excessive fine particles are removed. In addition, adhesive properties between layers may be remarkably improve by pressing after the layer of the amorphous type titanium peroxide is fixed with the thin layer of the photocatalyst semiconductor, the dielectric ceramic material or the conductive ceramic material. A homogeneous thin layer may thus be formed.

By forming a thin layer composed of a photocatalyst semiconductor, a dielectric ceramics or a conductive ceramics, reduction of weight and volume of an electric instrument and the like can be achieved. In addition, with the help of a laminated thin film of a photocatalyst semiconductor, a substrate having a photocatalyst function is effective in reducing a decline of a function caused by a mutual interference of particles on a surface of a photocatalyst semiconductor when electrons move in an oxidation-reduction reaction, and reducing an economical loss due to the formation of a thick film.

EXAMPLES

Next, the present invention will be described in more detail in accordance with examples, however, the scope of the present invention should not be limited by these examples.

REFERENCE EXAMPLE 1

Preparation of an Amorphous Type Titanium Peroxide Sol 100 ml of a 50% titanium tetrachloride $TiCl_4$ solution (made by SUMITOMO SITX CO.) was diluted 70 times with distilled water, and a 25% ammonium hydroxide $NH_4OH$ solution (made by TAKASUGI PURECHEMICAL INDUSTRY Ltd.) was diluted 10 times with distilled water, and they were mixed with each other and then adjusted to pH 6.5 to 6.8 to carry out a reaction. After completion of the reaction, it was allowed to stand for a while, and a supernatant liquid was thrown away. To the remaining $Ti(OH)_4$ gel, distilled water was added in an amount about 4 times as much as the amount of the gel, and the solution was sufficiently stirred and then allowed to stand. Next, water washing was repeated until a conductivity reaches 2 to 10 $\mu S$ by a conductivity meter, and finally, a supernatant liquid was thrown away to leave a precipitant alone. In a certain case, a concentration treatment can be carried out by the use of a concentrating machine. Afterward, 210 ml of a 35% aqueous hydrogen peroxide solution was divided into two portions and they are separately added every 30 minutes to 3600 ml of the lightly bluish white $Ti(OH)_4$, and the solution was then stirred overnight at about 5° C. to obtain about 3800 ml of a yellow transparent amorphous type titanium peroxide sol.

Incidentally, it is preferable that the generation of heat is restrained in all the steps mentioned above, because a water-insoluble substance such as metatitanic acid might be precipitated, unless the heat generation is restrained.

Example 1

Preparation of a Viscous Amorphous Type Titanium Peroxide 100 ml of a 50% titanium tetrachloride $TiCl_4$ solution (made by SUMITOMO SITX CO.) was diluted 70 times with distilled water, and a 25% ammonium hydroxide $NH_4OH$ solution (made by TAKASUGI PURECHEMICAL INDUSTRY Ltd.) was diluted 10 times with distilled water, and they were mixed with each other and then adjusted to pH 2.5 to carry out a reaction. After completion of the reaction, it was allowed to stand for a while, and a supernatant liquid was thrown away. To the remaining $Ti(OH)_4$ gel, distilled water was added in an amount about 4 times as much as the amount of the gel, and the solution was sufficiently stirred and then allowed to stand. Next, water washing was repeated until a conductivity reaches 2 to 10 $\mu S$ by a conductivity meter, and finally, a supernatant liquid was thrown away to leave a precipitant alone. In a certain case, a concentration treatment can be carried out by the use of a concentrating machine. Afterward, 200 ml of a 35% aqueous hydrogen peroxide solution was divided into two portions and they are separately added every 30 minutes to 2550 ml of the lightly bluish white aqueous $Ti(OH)_4$ solution, and the solution was stirred overnight at about 5° C. and then cured at ordinary temperature for 7 to 10 days to obtain about 2800 ml of a yellow transparent jelly amorphous type titanium peroxide sol.

Example 2

Preparation of a Viscous Amorphous Type Titanium Peroxides with Various Viscosities The same procedure as in Example 1 was conducted except that a pH of a reaction solution was maintained at 3, 4 and 5, and in accordance with the increase of the pH, a jelly product was obtained which was harder than the viscous amorphous type titanium peroxide obtained in Example 1 and a solid concentration also gradually increased.

Example 3

A plate of an acrylic resin, a plate of methacrylic resin and a plate of a methyl methacrylate resin were used as substrates. After the surfaces of the resin plates were washed and then dried, they were once coated by dipping with 0.3% by weight of the viscous titanium peroxide obtained in Example 1. An anatase type titanium peroxide powder ST-01 (made by ISHIHARA SANGYOU KAISYA Ltd.) was adhered to the plates in a homogeneously floating state in the container while the coated surfaces were wet, and they were dried at 50° C., afterward heated at 200° C. as a pressure was applied, and then washed to manufacture the photocatalyst semiconductor substrates.

Different from former substrates, the above-mentioned substrates were extremely excellent in that the surfaces had no danger to be peeled off because the layers of photocatalysts were thin films, and in that a function to decompose organic compounds.

Example 4

A tile coated with a semi-porcelain (made by INAX Co., Ltd.: 100×100×5 mm), a steel plate coated with ceramics (210×296×0.8 mm) and a keramit plate (coated type: 157× 223×4 mm) were used as substrates. After the surfaces of the substrates were washed and then dried at ordinary temperature, they were coated with squeezed plates composed of 0.3% by weight of the viscous titanium peroxide obtained in Example 1. A tile coated with semi-porcelain, a steel plate coated with ceramics and a keramit plate were respectively coated with the plate which weighed 0.1 to 0.2 g/sheet, 2.0 to 2.3 g/sheet and 1.5 to 1.8 g/sheet. An anatase type titanium peroxide powder ST-01 (made by ISHIHARA SANGYOU KAISYA Ltd.) was adhered to the plates in a homogeneously floating state in the container for 1 minute while the coated surfaces were wet, and the amount of the adhered anatase type titanium peroxide powder was 0.01 to 0.02 g/sheet on a tile coated with a semi-porcelain, 0.1 to 0.2 g/sheet on a steel plate coated with ceramics, and 0.1 g/sheet on a keramit plate, and they were dried at 50° C., afterward heated at 500° C. to manufacture the photocatalyst semiconductor substrates.

The thus obtained substrates were extremely excellent in that they were easily decorated and showed high adhesiveness.

Example 5

A cloth with thick fibers in a polyester-rayon family (300×300 mm) was used as a substrate. The cloth was washed with water and dried, afterward it was coated by dipping with the viscous titanium peroxide, 0.3% by weight, which was obtained in Example 1. Next, an anatase type titanium peroxide powder ST-01 (made by ISHIHARA SANGYOU KAISYA Ltd.) was adhered to the cloth in a homogeneously floating state gas in the container and it was dried and fixed at 50° C. Afterward, the dried cloth was pressed by an iron at 120 to 150° C. to improve adhesiveness between layers.

The substrate was extremely excellent in that it was easily decorated and showed high adhesiveness, especially it had high ability of decomposition.

Example 6

An ability of decomposition of organic substances were examined as mentioned next. A paraglass (a methacrylic resin made by KURARAY Co., Ltd.: 210×296 mm) was used as a substrate. It was coated by dipping with the viscous titanium peroxide, 0.3% by weight, which was obtained in Example 1. Next, an anatase type titanium peroxide powder ST-01 (made by ISHIHARA SANGYOU KAISYA Ltd.) was adhered to the resin in a homogeneously floating state gas in the container and it was dried and fixed at 50° C. Afterward, the dried resin was pressed by an iron at 120 to 150° C. to improve adhesiveness between layers, and photocatalyst substances supporting photocatalysts were then obtained. The photocatalyst substances were set in an examination container and a colored solution of organic substances to be decomposed were poured into the container, so that depth of solution was 1 cm. The colored solution was made by diluting a pollucite red PM-R (made by SUMIKA COLOR Co., Ltd.) which was a water dispersion compound of a monoazored (a red liquid state substance), so that it was 30 times in volume. Next, the container was sealed with a floating glass (the part was cut the wave of which was below 300 nm) so as to prevent the colored solution from evaporating. At 5 cm above the examination container 9.5 cm apart from the substrate, 2 ultraviolet rays radiation machines (blue color fluorescence lights with 20 w) were set at intervals of 13 cm to radiate the mentioned photocatalyst substance. And decomposition of organic substances were considered to be finished at the moment that the color of the colored solution disappeared. As a result, 2 days after the examination started, the color disappeared completely, so that it proved to have an excellent function as a photocatalyst.

Field of Industrial Utilization

When the viscous amorphous type titanium peroxide in the present invention, a layer of an amorphous type titanium peroxide can be formed and no substrates require any hydrophilization treatment by the use of a surface active agent and the like, in addition, the excellent adhesiveness enables a thin layer of a photocatalyst semiconductor, a dielectric ceramics or an electrical ceramics to be fixed, furthermore, reduction of weight and volume of an electric instrument and the like using the thus obtained thin layer can be achieved. In addition, with the help of a laminated thin film of a photocatalyst semiconductor, a substrate having a photocatalyst function is effective in reducing a decline of a function caused by a mutual interference of particles on a surface of a photocatalyst semiconductor when electrons move in an oxidation-reduction reaction, and reducing an economical loss because of a thick film.

What is claimed is:

1. A method for fixing an amorphous type titanium peroxide layer on a substrate, which comprises the steps of: coating the substrate with an amorphous type titanium peroxide sol, and then drying and calcining the coated substrate at ordinary temperature to less than 250° C.

2. A board having an amorphous type titanium peroxide layer obtained by a method described in claim 1.

* * * * *